Oct. 12, 1971          B. L. COCHRAN                3,611,525
          CUTOFF OR GROOVING TOOL AND HOLDER THEREFOR
Original Filed March 28, 1970                   2 Sheets-Sheet 2
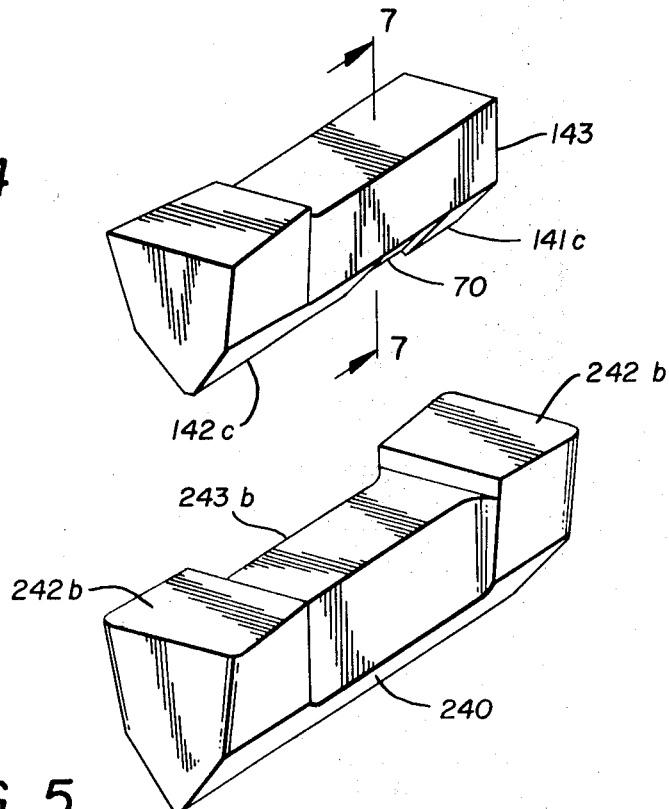
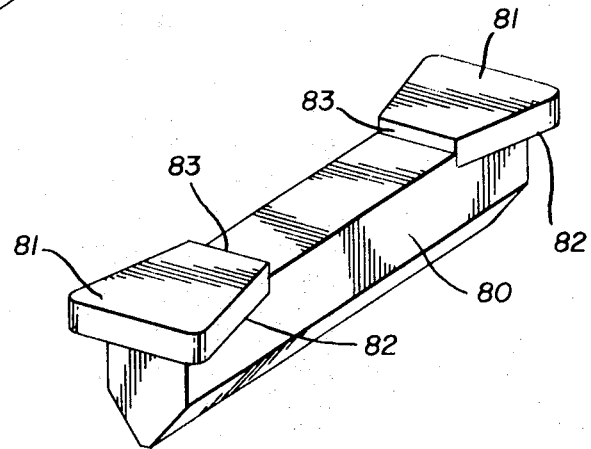
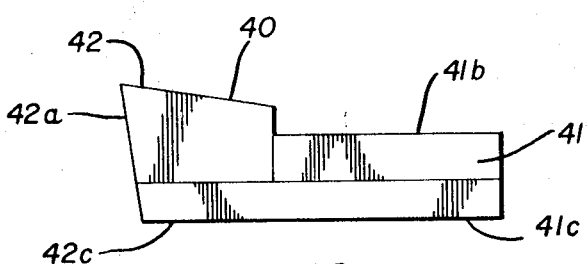
INVENTOR.
BURTON L. COCHRAN
BY
ATTORNEYS United States Patent Office 3,611,525
Patented Oct. 12, 1971

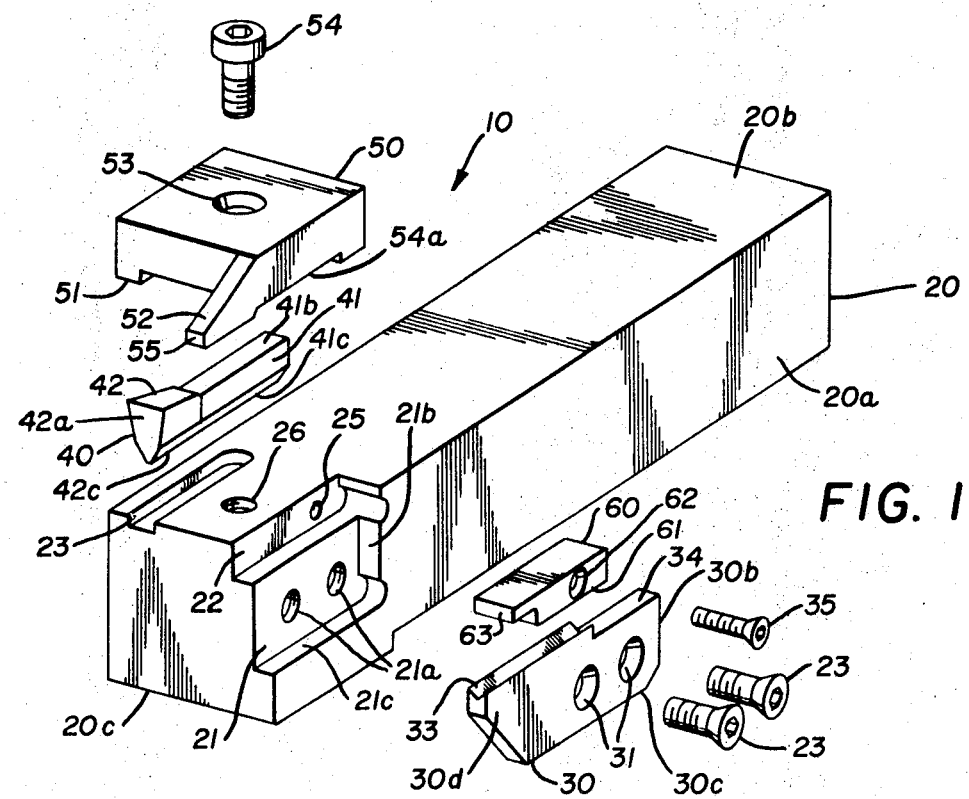
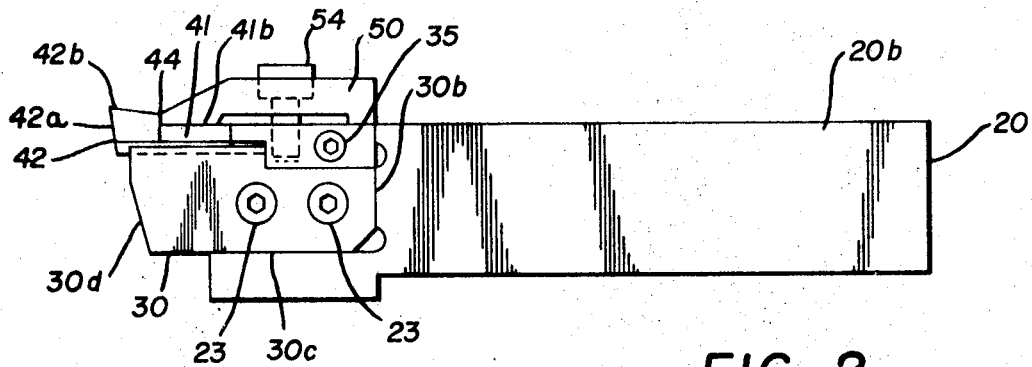
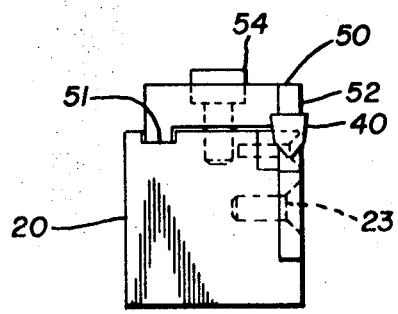
FIG. 1
FIG. 2
FIG. 3
INVENTOR.
BURTON L. COCHRAN

3,611,525
CUTOFF OR GROOVING TOOL AND HOLDER THEREFOR
Burton L. Cochran, North Canton, Ohio, assignor to The Warner & Swasey Company, Cleveland, Ohio
Continuation of abandoned application Ser. No. 716,843, Mar. 28, 1970. This application Apr. 1, 1970, Ser. No. 24,808
Int. Cl. B26d 1/00
U.S. Cl. 29—95     7 Claims

ABSTRACT OF THE DISCLOSURE

A cutoff or grooving tool that includes a holder and a replaceable cutting insert with the holder including a main body portion, a support blade, and a clamping arm and with the insert being an elongate, relatively pencil-like component adapted to be seated on the blade of the holder and clamped in place thereon by the clamping arm with a backup element serving to determine the extent of longitudinal projection of the cutting insert on the support blade. The insert and holder are characterized by complementarily engaged V-shaped surfaces of the type set forth in Novkov U.S. Pat. 2,964,833.

The shank portion of the insert generally has a lesser height than the shank portion of the insert shown in Novkov Pat. 2,964,833 while the cutting tip portion thereof has a proportionately greater height than that of the insert shown in Novkov U.S. Pat. 2,964,833.

Use of the backup component rearwardly of the insert permits use of a series of such members so as to insure correct positioning of inserts having shank portions of different length.

RELATED APPLICATIONS

This application is a continuation of applicant's earlier file application, Ser. No. 716,843, filed Mar. 28, 1968, now abandoned, for Improved Cutoff or Grooving Tool and Holder Therefor.

BACKGROUND OF INVENTION

(A) Field of invention

This invention relates to the art of metal cutoff and particularly that type of metal cutoff wherein a rigid cutoff tool is advanced into the periphery of a rotating work piece so as either to effectuate cutoff of a portion of the work piece or to place a groove in the same as required.

Applicant believes the general field of the invention is best shown in applicant's prior U.S. Pats. 2,867,756 and 2,964,833 with the former patent relating to the combination of components making up the cutoff tool while the latter patent relates to the insert per se.

(B) Description of prior art

The art of metal cutoff presents a problem peculiar to the art of metal working because of the extreme pressures that are placed on the cutoff tool as it is being used.

Characteristically, in the art of metal working, the majority of the work is done with metal bits that are, in effect, "single point" types of tools adapted to perform the operations of shaping, facing, chamfering, and the like.

In this type of tool construction, it is possible to use a pencil-like bit that is ground to the right contour so as to have a point-like contact with the revolving work.

However, in the cutoff or grooving operation it is apparent that more than a "single point" of contact exists between the work and the tool with the tool having to cut a groove and thus remove considerably more metal than is the case in operations employing "single point" types of tooling. Thus, in this operation, the contact between the tool and the work piece is more of a "line" type contact between a cutting edge and the periphery of the work.

Because the force of cutoff is essentially one directed in a downward direction at the point of contact, it is apparent that if the usual type of bit were extended to project or overhang beyond its point of support to the extent required to achieve the depth of cut required, that a tremendous moment builds up at the projecting end of the cutoff tool with the result that the same will break if not given additional support beneath the cutting edge.

This build-up of pressure is caused because the surface speed of the work decreases as the tool approaches the center of the work. Additional problems are caused also by the pressure required to remove chips from the wall of the cut.

To avoid such failure, cutoff tools in the past have resorted to a blade-like structure of which representative teachings are shown in Luers U.S. Pat. 2,176,265 and Anthony U.S. Pats. 2,149,038, 2,254,056 and 2,398,913.

The theory involved is that increasing the height of the cutting element gives rigidity and additional support to the cutoff tool and prevents failure. The mathematics involved are similar to the mathematics involved in building construction wherein strength is added to girders, for example, by merely increasing the height thereof.

However, heightening of a cutoff tool into a blade-like configuration also creates certain disadvantages, the principal one of which is the inability to properly support the same in a truly vertical condition at all times. Thus, as a practical matter, in using tooling of the type shown in the aforementioned Luers and Anthony patents that there is always a tendency of the blade in question to be influenced by forces applied to its sides and become misaligned from true vertical condition which results in damage to the tool necessitating premature replacement. This unbalance tends to become magnified because the angle between the cutting edge and the work surface is decreased on one side and increased on the other.

It has been discovered, however, that the height advantages of blade type construction can also be achieved without the disadvantages of toppling that would otherwise occur in such type construction.

Essentially, it has been found that by dividing a blade-type support into a support and cutting component and by making the cutting component relatively small in comparison to the height of the support component that all advantages of the blade-type construction could be achieved while still having the inherent rigidity attributable to bit-type construction. The subject matter of such improvement is set forth in the Novkov patents aforementioned.

SUMMARY OF INVENTION

The present invention constitutes an even further refinement and improvement upon the basic concept as disclosed in the aforementioned Novkov patents. Specifically, the insert bit components of these patents, which are consumable components of the tooling, are characterized by the fact that the top surfaces of the tip and shank are coplanar so as to permit common engagement thereof by the undersurface of the overlying clamping arm. While such construction has considerable merit as demonstrated by the wide commercial success that the invention has enjoyed, it has been found that an even greater cutting efficiency can be achieved with less cost if certain modifications to the basic geometry of the Novkov insert are undertaken.

Specifically, the present invention contemplates the rearrangement and relocation of the top surfaces of the insert bit so as to, in effect, achieve a lowering of the top surface of the shank portion of the bit beneath what would otherwise be considered a common co-planar top surface with the similar raising of the top surface of the tip portion of the bit. The advantages achieved from such a construction are five-fold.

First, by lowering the top surface of the shank portion, a more squat type of shank with a lower center of gravity is provided to thus increase the ability of the clamping arm to resist toppling in the relatively longer shank portion.

Second, by elevating the top surface of the tip portion, this portion has a more "blade-like" configuration so as to inherently increase its ability to resist the downward forces to cutoff.

Third, by providing a vertical shoulder between the non-planar top surfaces the clamp is able to assist in the increase rigidity by providing resistance against rearward movement of the bit during cutoff. This is also facilitated by the provision of a stop member resting on the support blade and abutting the back of the insert.

Fourth, by elevating the top surface of the tip, the operator is able to provide himself with additional grinding angles such as, for example, positive rake, which can be more efficiently provided on the insert tool where the cutoff application in question requires the same.

Fifth, by increasing the cutoff tool efficiency in the manner just described, a reduction in the amount of material required is permitted with the result that cost savings can be achieved without the loss of the cutoff efficiency.

Sixth, the location of the point of contact between the clamping arm and the insert insures that chips cannot be wedged or packed between the clamp and the top of the insert.

Production of a new and improved cutoff tool of the type just described accordingly becomes the principal object of this invention, with other objects thereof becoming more apparent upon a reading of the following brief specification, considered and interpreted in the light of the accompanying drawings.

Of the drawings:

FIG. 1 is an exploded perspective view of the improved cutoff tooling.

FIG. 2 is a side view of the same in assembled condition.

FIG. 3 is an end elevational view of the improved cutoff tooling in assembled condition.

FIGS. 4, 5 and 6 are perspective views of modified forms of the improved insert bit.

FIG. 7 is a vertical section taken on the lines 7—7 of FIG. 4.

FIG. 8 is a side elevational view of the insert bit of FIGS. 1 through 3.

DETAILED DESCRIPTION OF DRAWINGS

Referring now the drawings and in particular to FIG. 1 thereof, the improved cutoff tooling, generally designated by the numeral 10, includes a body portion 20, a support blade 30, an insert bit 40, a clamping arm 50 and a backup component 60, with the body 20 having a squared or otherwise contoured rearward portion that permits attachment of the same to the tool post, lathe, or other machine tool so as to permit a cutoff operation to be effectuated when the component parts are assembled as will now be described.

To this end, the body portion 20, which is generally of a square-cross-sectional configuration in the form shown, is provided with undercut surfaces 21, 22 and 23 with the surfaces 21 and 22 being undercut with respect to side surface 20a while the surface 23 is undercut with respect to top surface 20b as clearly shown in FIG. 1 of the drawings.

The planar contour of the surface 21 is such that the same snugly receives the support blade 30 with the forward portion 30d thereof projecting forwardly of the front end 20c of the body 20 so as to be beneath the insert bit 40 in supporting relationship as clearly shown in FIG. 2 of the drawings. Tapped apertures 21a, 21a in body 20 receive screws 23, 23 that also pass through holes 31, 31 of support blade 30 with this arrangement providing for clamping of the support blade 30 with respect to the tool body 20 and with the rear and lower edges 30b and 30c of the blade being engaged with the surface 21b and 21c respectively of the pocket created by the undercut surface 21.

In addition to the aforementioned contour characteristics, the support blade 30 includes a V-shaped top edge 33 which extends from its forward edge rearwardly to a point where it opens into the offset surface 34 with the offset surface 34 serving as a seat for the lower edge 61 of backup member 60 as will be subsequently described.

Considering backup member 60 in greater detail and as shown in FIG. 1, backup member 60 has a through bore 62, having a countersunk opening, is adapted to receive the screw 35 with tapped aperture 25 being provided in surface 22 of body 20 for the purpose of receiving the threaded end of screw 35.

It will also be noted that the backup member 60 includes a forward end 63 of reduced height and is adapted to be received in overlying relationship to the rearward portion of the V-shaped groove 33 of blade 30 with this portion 63 serving to back up the rearward end of the insert 40 as is apparent from FIG. 2 of the drawings.

Turning next then to the clamp 50, the same is of generally block-like configuration and includes a tongue portion 51 provided on one edge and adapted to be received in the groove 23 on top surface 20b of body 20 with this arrangement serving to permit the projecting arm portion 52 to be aligned in overlying relationship to the insert 50 as is clearly shown in FIGS. 2 and 3 of the drawings. The bore 53 receives the screw 54 that is in turn threaded and attached to tapped aperture 26 provided on the forward portion of the upper face 20b of the tool body 20. The forward edge of the arm 52 of clamp 50 is provided with a vertical shoulder 55 and the central portion of arm 52 is undercut as at 54a.

The insert 40 shown in FIGS. 1 through 3 preferably is of one piece unitary construction so as to include a shank portion 41 and a tip portion 42 with the tip portion 42 having a height that is greater than the height of the shank portion 42 so as to create a vertically extending shoulder 44. Preferably the tip portion 42 includes, in its pre-formed condition, side clearance wherein the thickness of the tip decreases from top to bottom, front clearance wherein the front face 42a of the tip 42 tapers rearwardly from top to bottom as shown in FIG. 2 and back clearance wherein the width of the top surface 42b decreases toward the rear of the bit.

Further in this regard, it will be noted from FIG. 2 that it is contemplated that the top surface 42b of the tip will be ground or precast to the tapered condition shown in FIG. 2 so as to provide a positive rake angle, in instances where such a cutoff angle is required. However, the insert could also have top surfaces 41b and 42b lying in parallel planes if desired.

Finally it will be noted that both the tip and shank have V-shaped bottom surfaces 41c, 42c which cooperate with V-shaped surface 33 of blade 30 as will be described.

In use or operation of the improved cutoff tool, it will first be assumed that the component parts have been machined to the condition shown in FIG. 1 and it will further be assumed that the support blade 30 has been secured in the pocket defined by surfaces 21, 21b and 21c by the insertion of screws 23, 23 through openings 31, 31 and into the tapped apertures 21a, 21a. At this point, the clamp 50 can be positioned on the tool body by use of the screw 54 following alignment of rib 51 in groove 23. At this point, and prior to tightening of the screw 54, the backup member 60 can be positioned in place by passing screw 35 through opening 62 therein and into tapped aperture 25.

It is then merely necessary that the insert 40, having co-planar V-shaped bottom surfaces 41c and 42c, can be positioned on the V-shaped groove 33 so that shoulder 44 is in abutment with the forward shoulder 55 of a clamp 50 although it is not absolutely necessary that this abutment occur since backup member 60 will also resist rearward movement.

At this time, screw 54 may be tightened to firmly clamp the insert 40 in place and it will be noted that rearward movement of the insert 40 is resisted by one of two forces, these forces being (a) the mechanical interlock between shoulder 44 and shoulder 55 and (b) the mechanical engagement between forward end 63 of the backup member 60 and rearward end of shank 41. In some instances both of the forces may be operative. It is apparent that by this construction a duel backup system is provided and it is to be noted that either one of these engagements is sufficient to satisfactorily retain the insert against rearward movement.

When an insert has become worn following use, it is merely necessary that the screw 54 be backed off whereupon the insert 40 can be easily moved forward for release from the tool. If only sharpening is required, the insert can be repelaced without any change in the length of the backup member because of the dual stop construction previously described although this is subject to some limitation depending upon how much grinding is required. However, if it is desired to use a new insert of different length, it is merely necessary to remove the backup member 60 and replace the existing member with the one that is shorter or longer depending upon the length of the insert.

Thus, if a shorter insert is used, it is apparent that a longer backup member will be required; on the other hand, if a longer insert is used, the length of the backup member will be shortened.

THE MODIFICATION OF FIGS. 4 AND 7

The insert bit shown in FIGS. 4 and 7 is similar in most respects to the insert shown in FIGS. 1 through 3 and accordingly, where appropriate, similar reference numerals will be employed to designate like parts.

Accordingly and referring to FIGS. 4 and 7, it will be noted that an undercut 70 is provided in the lower V-shaped bottom surface 141c of the shank member 143 with this undercut serving to permitt a slight flexing of the insert so as to insure firm seating within the V-shaped groove 33 of support blade 30 during periods of use.

THE MODIFICATION OF FIG. 5

The modification of FIG. 5 is merely a double ended version of the insert shown in FIGS. 1 and 3 with it being apparent that this insert 240 is adapted for conditions of use where it is desired to have a double ended insert to reduce the overall cost of cutoff. The component portions of each end are identical to the cutting end portions previously described in connection with the tip 42 with each end being provided with front, side, and back clearance and with each top surface 242b being elevated with respect to the top shank surface 243b shown in FIG. 5. It will be noted, with reference to FIG. 5, that the undercut 54a that is provided on the clamping member 50 serves to house the inoperative end 242b during period of use.

THE FIG. 6 MODIFICATION

In the modified form of the insert shown in FIG. 6, of the drawings, the same principles of geometry, employed in FIG. 5, are utilized with the exception that the one piece construction of FIG. 5 is varied to include a main shank portion 80 having wafer-like cutting tips 81, 81 provided at the opposed ends thereof. These identical wafer members 81, 81 have the appropriate front, back and side clearance as illustrated in FIG. 6 and are further received in undercut pockets 82, 82 so as to provide opposed shoulders 83, 83 as shown in FIG. 6. The depth of pockets 82, 82 is preferably less than the thickness of the inserts 81, 81 so as to define the just mentioned shoulders 83, 83 to assure achievement of the aforementioned desirable clamping features of this invention when used with clamp 50.

CONCLUSION

It will be seen from the foregoing, then, that there has been provided a new and improved type cutoff tool characterized by the presence of an improved cutoff insert having a unique and distinct geometry that permits attainment of increased cutoff strength using a reduced amount of material. It has been further shown how this new geometry facilitates co-action of the insert with an improved combination of cutoff elements that include a variable length backup member so that in all events, a backup stop is provided for safety purposes.

While a full and complete description of the invention has been set forth in accordance with the dictates of the patent statutes, it is to be understood that the invention is not limited to the specific form and embodiment herein shown. Accordingly, modifications of the invention may be resorted to without departing from the spirit thereof or the scope of the appended claims.

What is claimed is:

1. A cutoff insert of the character described, comprising:
    (A) an elongate, unitary bit of stubby, pencil-like cross-sectional configuration and including
        (1) an elongate shank portion and
        (2) at least one cutting tip portion that is disposed on one end of said shank portion and projects co-extensively thereof;
    (B) said shank portion having
        (1) opposed planar side surfaces of equal height and longitudinal length
        (2) a planar top surface substantially equal in length to the longitudinal length of said side surface and having a width substantially equal to the height of said side surfaces, with said top surface being interconnected to said side surfaces at substantially right angles and with
        (3) a V-shaped bottom surface defined by bottom components that project downwardly from said opposed side surfaces at equal obtuse angles whereby the apex of said V-shaped surface is disposed midway between said side surfaces;
    (C) said cutting tip portion including
        (1) opposed side surfaces;
        (2) a top surface;
        (3) a front surface; and
        (4) a V-shaped bottom surface;
    (D) the point of juncture of said front, top and side surfaces of said tip defining a cutting edge;
    (E) said front, top and side surfaces of said tip being provided with front, side and back clearance angles while said bottom surface is coplanar with the bottom surface of said shank;
    (F) said top surface of said tip being elevated above said top surface of said shank whereby a shoulder is provided between said top surfaces of said tip and said shank; and
    (G) said shoulder being
        (1) disposed at substantially right angles to said top surface of said shank and the location and height of said shoulder being such that a wide range of positive rake angles can be ground on said top surface without destroying the force resisting characteristics of said shoulder.

2. The device of claim 1 further characterized by the fact that said bottom components of said shank are undercut at a point intermediate the ends of said shank.

3. The device of claim 1 further characterized by the presence of a second identical cutting tip portion disposed on the opposed end of said shank.

4. The device of claim 1 further characterized by the fact that said cutting tip portion is integral with said shank.

5. The device of claim 3 further characterized by the fact that said cutting tip portions comprise relatively thin, wafer like elements mounted on said shank.

6. An insert bit of the character described comprising:
   (A) an elongate shank portion having a top surface, opposed side surfaces, and a bottom surface of V-shaped configuration, with the apex of said V-shaped surface defining the longitudinal center of said shank portion;
   (B) a cutting tip portion projecting longitudinally from said shank in coextensive relationship therewith and having a top surface that includes a cutting edge, opposed side surfaces, and a V-shaped bottom surface that is coextensively aligned with the V-shaped bottom surface of said shank;
   (C) the top surface of said tip being elevated above the top surface of said shank when said bit is viewed in side elevation; the cross-sectional width of said tip exceeding the cross-sectional width of said shank at the point of juncture between said tip and said shank; and
   (D) the shoulder that extends between the top surface of said tip and the top surface of said shank being of sufficient height
      (1) to provide a surface that longitudinally resists the effect of cutting forces applied to said tip; and
      (2) to permit a relatively wide range of positive rake angles to be ground on said top surface of said tip without destroying the force-resisting characteristics abovementioned.

7. The insert bit of claim 6 further characterized by the provision of an identical cutting tip portion projecting longitudinally from said shank in coextensive relationship therewith at the opposed end thereof.

References Cited

UNITED STATES PATENTS

| | | | |
|---|---|---|---|
| 1,397,983 | 11/1921 | Rennie | 29—95 |
| 2,964,833 | 12/1960 | Novkov | 29—95 |
| 3,205,558 | 9/1965 | Stier | 29—96 |
| 3,254,392 | 7/1966 | Novkov | 29—95 |
| 3,316,617 | 5/1967 | Stein | 29—97 |
| 3,475,802 | 11/1969 | Kollar | 29—96 |
| 3,499,198 | 3/1970 | Pollard et al. | 29—96 |

HARRISON L. HINSON, Primary Examiner

U.S. Cl. X.R.

29—96